United States Patent
Zhang et al.

(10) Patent No.: US 10,141,842 B2
(45) Date of Patent: Nov. 27, 2018

(54) POWER CONVERTER AND AN LED LIGHTING CIRCUIT COMPRISING THE SAME

(71) Applicant: PHILIPS LIGHTING HOLDING B.V., Eindhoven (NL)

(72) Inventors: Xianhui Zhang, Shanghai (CN); Ken K. Li, Shanghai (CN); Zhi Quan Chen, Shanghai (CN); Junhu Liu, Shanghai (CN); Ace Li, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,636

(22) PCT Filed: Jun. 29, 2016

(86) PCT No.: PCT/EP2016/065128
§ 371 (c)(1),
(2) Date: Jan. 3, 2018

(87) PCT Pub. No.: WO2017/005573
PCT Pub. Date: Jan. 12, 2017

(65) Prior Publication Data
US 2018/0241307 A1    Aug. 23, 2018

(30) Foreign Application Priority Data

Jul. 3, 2015  (WO) ................ PCT/CN2015/083331
Oct. 29, 2015  (EP) ..................................... 15192078

(51) Int. Cl.
H02M 3/156  (2006.01)
H02M 3/338  (2006.01)
(Continued)

(52) U.S. Cl.
CPC .......... *H02M 3/156* (2013.01); *H02M 3/3385* (2013.01); *H05B 33/0815* (2013.01); *H05B 37/02* (2013.01); *H02M 1/4225* (2013.01)

(58) Field of Classification Search
CPC ...................................................... H02M 3/156
See application file for complete search history.

(56) References Cited

U.S. PATENT DOCUMENTS 4,590,395 A  *  5/1986  O'Connor ........... H02M 7/5387
                                                    327/374
5,396,112 A  *  3/1995  Michel ................... H03K 17/18
                                                    327/198
9,894,722 B2 *  2/2018  Chen .................. H05B 33/0815

FOREIGN PATENT DOCUMENTS

CN            204104165 U          1/2015

* cited by examiner

*Primary Examiner* — Harry Behm
(74) *Attorney, Agent, or Firm* — Akarsh P. Belagodu

(57) ABSTRACT

The invention provides a power converter comprising: an input for receiving input power with a variable nominal mains level, wherein said variable nominal mains level falls within at least 90V to 240V; a main power switch (Q1) driven by the input power, and a control circuit (Q2, Q3) for controlling a control current of the main power switch (Q1), wherein the control circuit in (Q2, Q3) is adapted to sense the level of the input power and draw current from a control terminal of the power switch (Q1) according to the level, and said control circuit is adapted to operate in linear region and increase the drawn current along with the increase of the level throughout the variable nominal mains level of the input power, wherein the control circuit comprises: a Darlington bridge with a first transistor (Q2) and a second transistor (Q3), the first transistor (Q2) with a base terminal connected to a circuit position indicative of the voltage amplitude of the input power, the second transistor (Q3) with (Continued)

a base terminal connected to an emitter terminal of the first transistor (Q2) and a collector terminal connected to the control terminal of the main power switch (Q1) and a collector terminal of the first transistor (Q2); and a resistor network (R3, R7) coupled to the emitter of the second transistor (Q3) for regulating the amplification of the second transistor (Q3) and keep the second transistor (Q3) working at linear region throughout the variable nominal mains level of the input power.

11 Claims, 4 Drawing Sheets

(51) Int. Cl.
    *H05B 37/02*         (2006.01)
    *H05B 33/08*         (2006.01)
    *H02M 1/42*          (2007.01)

POWER CONVERTER AND AN LED LIGHTING CIRCUIT COMPRISING THE SAME

CROSS-REFERENCE TO PRIOR APPLICATIONS

This application is the U.S. National Phase application under 35 U.S.C. § 371 of International Application No. PCT/EP2016/065128, filed on Jun. 29, 2016, which claims the benefit of International Application No. PCT/CN2015/083331, filed on Jul. 3, 2015 and European Patent Application No. 15192078.2, filed on Oct. 29, 2015. These applications are hereby incorporated by reference herein.

FIELD OF THE INVENTION

This invention relates to LED-based lighting.

BACKGROUND OF THE INVENTION

RCC (Ringing choke convertor) is widely used as LED driver circuit and charger due to low cost. However it is not widely used in the applications which require high performance. It's very hard for RCC circuit to achieve high Power factor, low THD, good line regulation at the same time.

FIG. 1 shows an RCC-based converter circuit which is a buck converter from CN204104165U and WO2015/181665A1. The energy storage inductor is L2 and the power switch is Q1. Self-oscillation is realized by auxiliary winding L3 magnetically coupled to the energy storage inductor L2 and connected to the base of the power switch Q1. Resistor R16 and R17 sense the power current through the power switch Q1 and feed back this information to a switch set such as the Darlington bridge Q2 and Q3, in order to regulate the base current of the power switch Q1. More specifically, the Darlington bridge Q2 and Q3 operates in on/off state to turn off/on the power switch Q1.

SUMMARY OF THE INVENTION

With respect to the circuit as shown in FIG. 1, cost is higher and it is very difficult to design and debug since a current sensing loop is required.

Embodiment of the invention aims to provide a low cost solution to achieve high power factor, low THD, good line regulation based on RCC circuit. Good line regulation means that the output of the converter is substantially same given different input voltage level for example from an 110V mains to a 220V mains, or called as universal mains. Here the term level means the nominal value of the input power, such as the effective value of a sine wave mains. For example, North America has a mains level at 110V, while in Europe the level is 220V. The term level does not mean the instant value or peak value of the sine wave mains.

To address this concern, a first aspect of the invention provides a ring choke power converter comprising an input for receiving an input power with a nominal mains level, wherein said nominal mains level is variable and falls within at least 90V to 240V, a main power switch driven by the input power, and a control circuit for controlling a control current of the main power switch, wherein the control circuit is adapted to sense the level of the input power and draw current from a control terminal of the power switch according to the level, and said control circuit is adapted to operate in linear region and increase the drawn current along with the increase of the level throughout said variable nominal mains level of the input power; wherein the control circuit comprises: a Darlington bridge with a first transistor and a second transistor, the first transistor with a base terminal connected to a circuit position indicative of the voltage amplitude of the input power, the second transistor with a base terminal connected to an emitter terminal of the first transistor and a collector terminal connected to the control terminal of the main power switch and a collector terminal of the first transistor; and a resistor network coupled to the emitter of the second transistor for regulating the amplification of the second transistor and keep the second transistor working at linear region throughout the variable nominal mains level of the input power.

In this aspect, the control circuit would sense the level of the input power and to draw current from the power switch, thus the power switch would maintain a substantially constant driving current regardless of the change in the level of the input power, due to that the drawn current would cancel the influence of the input power to the power switch. This mitigate the need of the current sensing loop thus is simple and low cost. Further, the control circuit is adapted to operate in linear region throughout the variable nominal mains level thus a good line regulation can be achieved in 90V to 240V range. More specifically, if there is no the resistor network, like the prior art, the current through base of Darlington bridge is linear only in a little range. But when the resistor network is added, the current from the base of the Darlington bridge through the resistor network will increase the resistance of base of Darlington bridge, and it will expand the linear work range to the desired scope of the variable nominal mains level, falling in 90V to 240V. Further, the resistor connected to the emitter of the second switch would act as a negative feedback element to regulate the amplification of the second switch regardless of component variance. Here the variable nominal mains level falls within 90V to 240V means the nominal mains level is different, for example it may be either 100V of Japan, 110V of north America or 230V of Europe, all of them falling within 90V to 240V.

In a further embodiment, the resistor network comprises a first resistor connected to the emitter of the second transistor.

In a further embodiment, the main power switch is a main power transistor, and the power converter further comprises a second resistor connected between the emitter of the main power transistor and ground, wherein said second resistor is adapted to increase the collector voltage of the second transistor such that the collector-base voltage of the second transistor is forwardly biased away from saturation region and the base of the first transistor is decoupled from the second resistor.

In this embodiment, the second resistor assists to ensure the Darlington bridge operate in the linear region, by increasing base voltage of the main power transistor and in turn increase the collector voltage of the second transistor to forwardly bias the collector-base voltage of the second transistor and keep it in the linear region.

In a still further embodiment, the switch set further comprises: an impedance tuning circuit, adapted to tuning the impedance of the resistor network according to an amplitude of the input power.

In this embodiment, the amplification of the second switch can be further tuned according to the input power thus the drawn current can be tuned more flexibly.

Preferably, the base current for the main power switch is expected to be reduced to as to keep the output constant, in case the input power is excessively high for example above 240V. Thus the impedance tuning circuit is adapted to decrease the impedance of the resistor and increase the amplification of the second switch when the voltage amplitude of the input power is above a threshold, and said variable nominal mains level falls within at least 90V to 305V. In this embodiment, the amplification of the second switch is further increased when input power is above a threshold and in turn it would draw an extra current, thus the base current of the main power switch is lowered.

In a further embodiment, the power converter is a self-oscillation type converter, and the power converter comprising: a main inductor, for storing energy from the input power and releasing energy during the switching of the main power switch; and an auxiliary inductor, magnetically coupled to the main inductor and connected to the control terminal of the main power switch, adapted for controlling the main power switch.

This embodiment applies the first aspect of the invention with self-oscillation type converter and is low cost.

In a still further embodiment, the auxiliary inductor is adapted to increase inductor current provided toward the control terminal of the main power switch along with the increase of the input power throughout said variable nominal mains level of the input power, and the difference current between the inductor current and the drawn current which eventually reaches the control terminal of the main power switch is substantially the same or slightly decreases as the input power increases throughout the variable nominal mains level.

This embodiment further explains how the present power converter achieves a substantially constant output throughout the variable nominal mains level, namely a good line regulation.

In a further embodiment, said circuit position is on a buffering capacitor that is charged by said auxiliary inductor.

In case of mains input, the buffer capacitor would smooth the sine ripple wave and obtains a constant voltage corresponding to the level/nominal value of the mains.

In a further embodiment, the control terminal of the switch set is coupled to the auxiliary inductor via a forward diode.

This embodiment provides negative bias to the switch set in case the main power switch is off, thus prevents the switch set from pre-mature conducting and ensures the power switch can be turned on.

In a second aspect, it is provided an LED lighting circuit, comprising LED and a power converter according to the first aspect.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a power converter comprising an input for receiving input power with a variable nominal mains level, wherein said variable nominal mains level falls at least 90V to 240V, a main power switch driven by the input power, and a control circuit for controlling a control current of the main power switch, wherein the control circuit is adapted to sense the level of the input power and draw current from a control terminal of the power switch according to the level, and said control circuit is adapted to operate in linear region and increase the drawn current along with the increase of the level throughout said variable nominal mains level of the input power.

Figure 1:
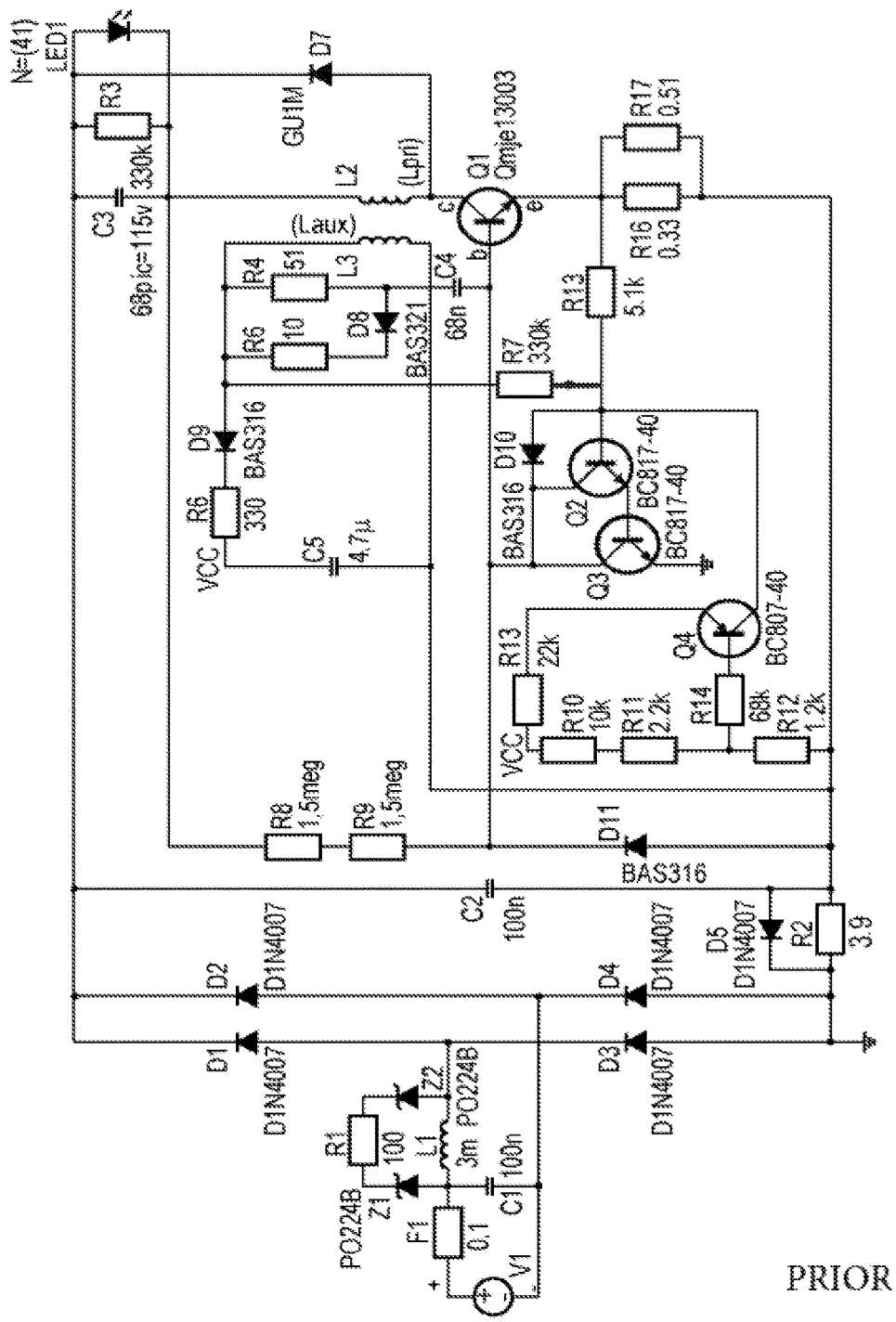
FIG. 1 shows an example of a prior LED driver circuit based on a Ringing Choke Converter ("RCC")
Figure 2:
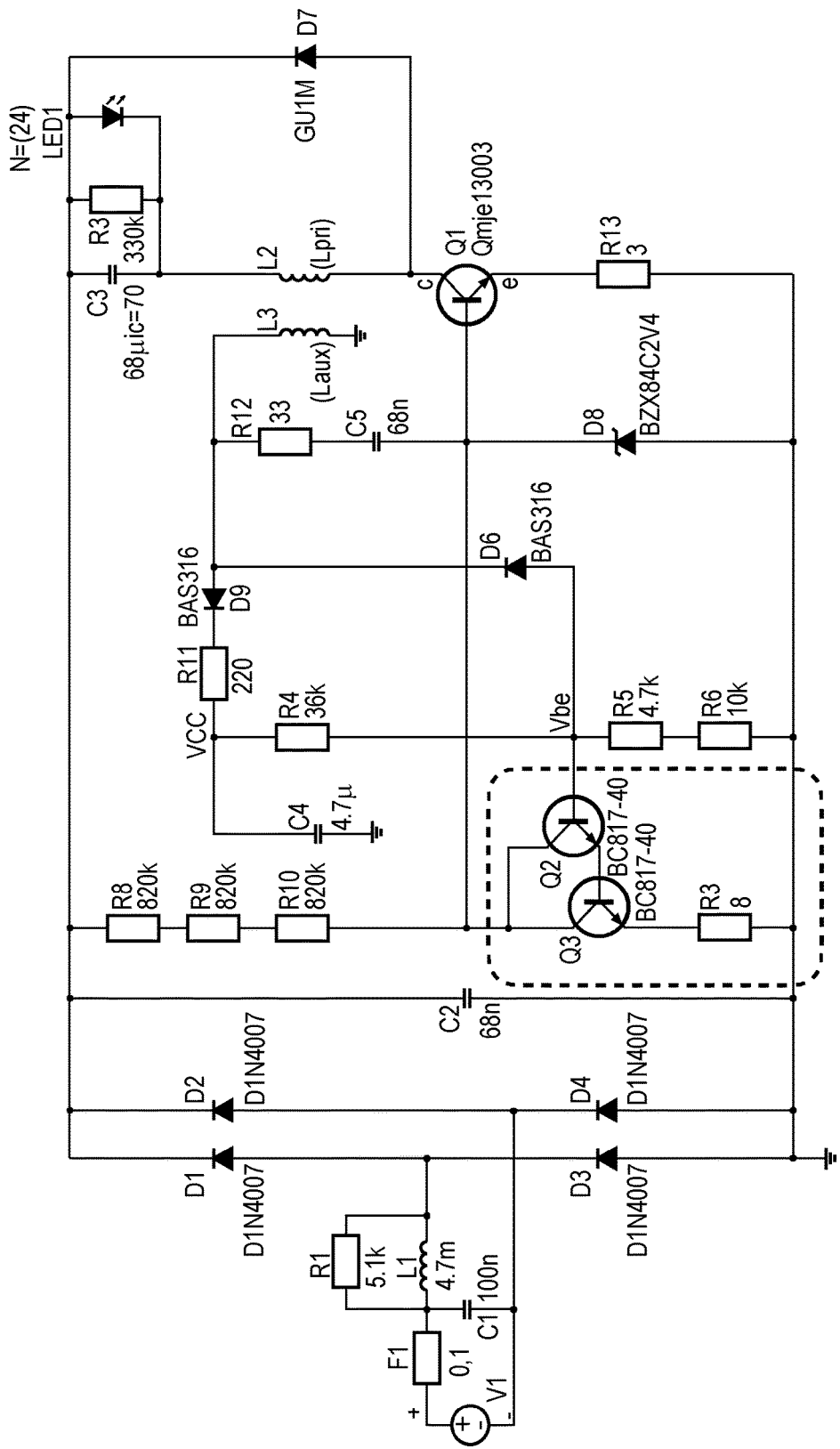
FIG. 2 shows a power converter according an embodiment of the invention.

FIG. 2 shows an embodiment of the invention. Wherein the power converter is a buck converter which is driven under an RCC topology which is based on self-oscillation principle.

The operation of this RCC based buck converter will be brief explained. On the DC line the input power is provided via the EMI-filter (C1, L1 and R1) and the rectifier bridge (D1 to D4) from the mains input V1 which may have a level depending on the local utility. Different regions and countries has different mains input level, as discussed above. The purpose of the embodiment of the invention is providing good line regulation throughout the all possible range of the mains input levels, say for example 90V-240V. There is a fuse F1 for overcurrent protection against an overcurrent twice higher than normal working current.

The resistor R8, R9 and R10 act as startup resistor, they couple the base of the main power switch Q1 to the DC line, and provide a startup current to the main power switch Q1. As the switch Q1 starts to conduct, current from the DC line flows through the LED1, the main inductor L2, the main power switch Q1 and back to the rectifier bridge and power source V1. A positive voltage occurs across the main inductor L2. An aux inductor L3 is coupled to the main inductor L2, and inductive voltage occurs across the aux inductor L3. This inductive voltage applies an extra base current to the main power switch Q1 and accelerates the switch Q conducting.

The inductive voltage on L3 is indicative of the voltage on the DC line and in turn indicative of the mains input level. This inductive voltage is smoothed by the circuit part D9, R11 and C4 into a relatively stable/constant voltage VCC.

This voltage VCC is provided to a control circuit, shown in the dash-block, and for determining how the control circuit draws base current away from the main power switch Q1 to turn it off. The control circuit is adapted to operate in linear region and increase the drawn current along with the increase of the level throughout the variable nominal mains level of the input power. Since the inductive voltage would provide an increased based current to the main power switch along with the increase of the level throughout the variable nominal mains level of the input power, the increased current drawn by the control circuit would counteract the increased current provided by the aux winding L2, thus maintains a substantially stable base current into the main power switch Q1.

As the current flows through the main power switch, when the current is increasing to a certain degree, the power switch Q1 would saturate. In this moment, the inductor L3 would reverse its inductive voltage and gradually make the power switch Q1 exits saturation state and enter cut off state. In an over current situation, the over load current flows through the resistor R13 and the voltage of base of Q1 is increased, then D8 begin to work, the voltage across the main inductor L2 decreases and so decreases the inductive voltage on the aux inductor L3. The control circuit finally turns off the main power switch Q1.

As the power switch Q1 cuts off, the energy stored in the main inductor L2 free wheels through the free wheeling diode D7 to the LED1. Meanwhile, the inductor L2 also resonates with body/parasite capacitor of the main power switch Q1. During the resonation, the voltage across the inductor L2 is first negative upper and then positive upper. In case the voltage becomes positive upper, the inductive voltage on the aux inductor L3 again provides a startup current to the base of the main power switch Q1 and turn it on. So repeats the operation.

The function of D6 is clamping the control circuit to a negative voltage point on the aux inductor L3 when the power switch Q1 is turned off, so as to prevent the control circuit from functioning all the time and prevent it from drawing the initial startup current of the main power switch Q1, meanwhile it can increase the efficiency of driver.

Now the description elucidates more about the control circuit. The control circuit comprises a switch set of controllable switches, wherein a control terminal of the switch set is connected to a circuit position indicative of the voltage amplitude of the input power, a current flowing in terminal of the switch set is connected to the control terminal of the power switch, and the switch set is adapted to operate in linear region throughout the variable nominal mains level range of the input power.

More specifically, the control circuit comprises a Darlington bridge. The Darlington bridge comprises a first switch Q2, with a control terminal connected to the circuit position VCC and a current flowing out terminal; and a second switch Q3, with a control terminal connected to the current flowing out terminal of the first switch Q2 and a current flowing in terminal connected to the control terminal of the power switch Q1 and a current flowing in terminals of the first switch Q2; wherein said first switch Q2 is adapted to operate in saturation region and the second switch Q3 is adapted to operate in linear region throughout the variable nominal mains level range of the input power.

Most importantly, Vbe of Q2 & Q3 is 1.2V normally. When the voltage of Vbe is above the 1.2V, if no R3, the current through base of Q2 & Q3 is linear in a little range. But when R3 is added, the current from Vbe through R3 will increase the resistance of base of Q2 & Q3, and it will expand the linear work range to cover a range of the variable nominal mains level which range is falling in 90V to 240V.

Moreover, the transistor Q2 and the resistor R13 at the emitter of the transistor Q1 ensure the transistor Q3 operating in linear region. When a transistor is statured, the collector current Ic does not increase as the base current Ib increases, the base-emitter is forwardly biased (the base voltage is higher than the emitter voltage), and the collector-base is reversely biased (the base voltage is higher than the collector voltage). When R13 is added, the voltage of base of Q1 is increased above 1.4V, normal value is 1.5V. Thus the collector-base of the transistor Q3 is forwardly biased (the base voltage is smaller than the collector voltage), and in turn the transistor Q3 can not enter the saturation region. In case Q2 is in linear region, the collector voltage of Q2 and Q3 would be even higher thus the collector-base of the transistor Q3 is more reversely biased and the transistor Q3 can not enter the saturation region.

Also, due to the existence of resistor R3, there is a negative feedback and it keeps the amplification ratio β of Q3. More specifically, due to component variance, β of the same rated transistor actually varies among a big range, say gain of Q2 & Q3 is diverse, from 200 to 400. This resistor R3 resistor would provide a uniform amplification of the whole control circuit. For a low β transistor, the emitter current is low thus the voltage across the resistor R3 is low, thereby a low emitter voltage and the emitter current will increase; and for a high β transistor, the emitter current is high thus the voltage across the resistor R3 is high, thereby a high emitter voltage and the emitter current will decrease.

Figure 3:
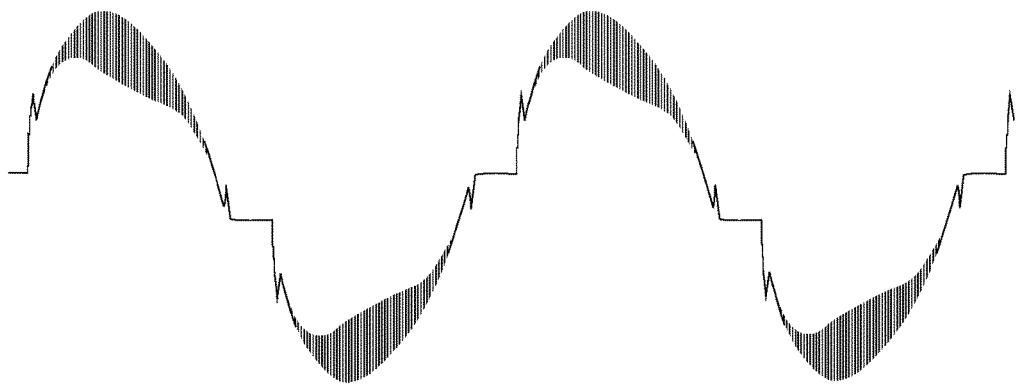
FIG. 3 shows the input current of the power converter as shown in FIG. 2.
Figure 4:
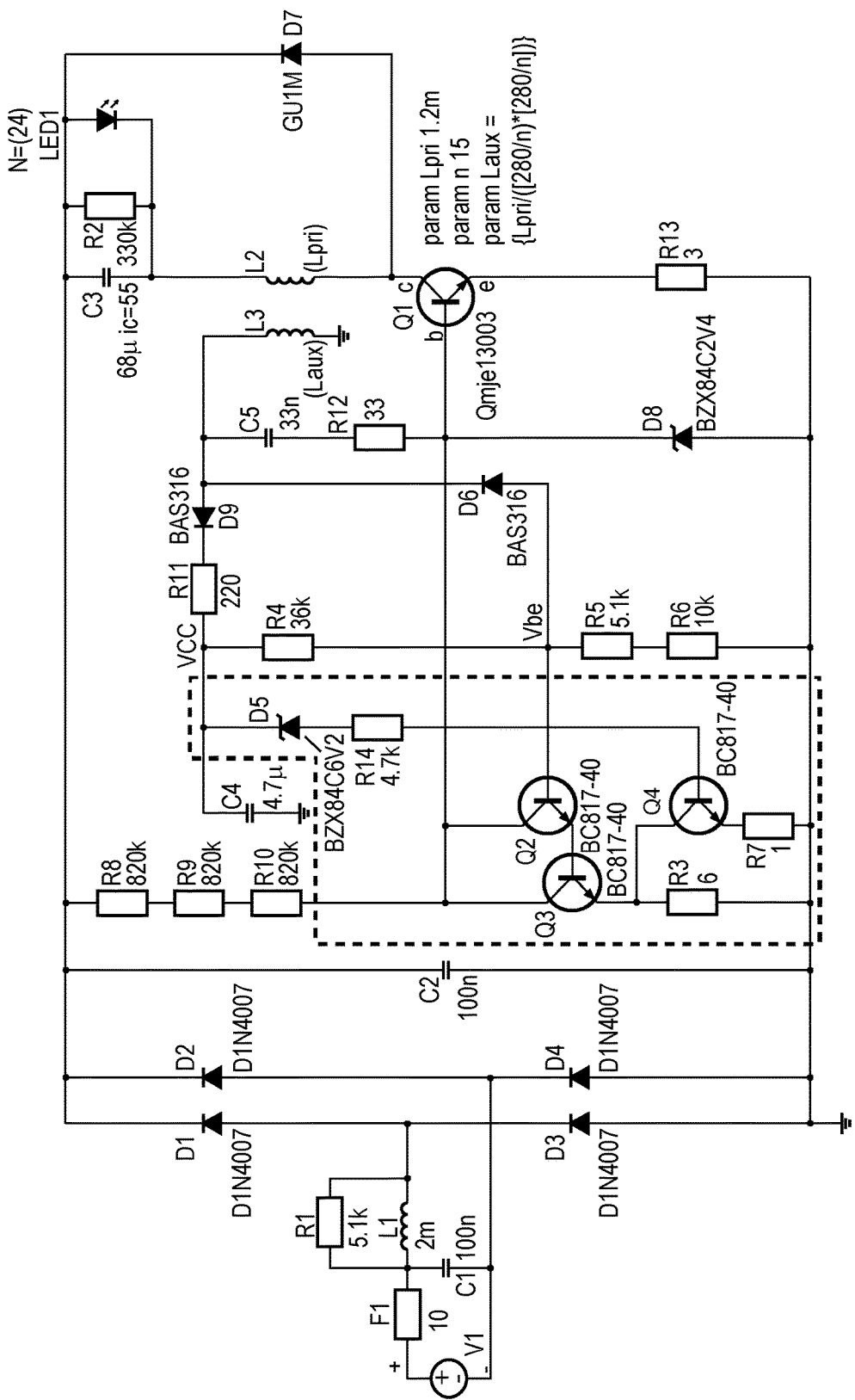
FIG. 4 shows an improved power converter according an embodiment of the invention.

FIG. 3 shows an input current waveform.

The inventors also find that a substantially constant base current for the main power switch is enough to provide good line regulation for a variable nominal mains level range falling within 90V to 240V. However, when the input voltage is even higher, for example from 240V to 305V, the substantially constant base current could not provide constant output. In this range, a slightly decreased base current is preferred, thus it is preferable that the control circuit could draw more current.

To meet this requirement, switch set further comprises: an impedance tuning circuit Q4, adapted to tuning emitter resistance of the transistor Q3 according to an amplitude of the input power. The impedance tuning circuit Q4 is adapted to decrease the emitter resistance and increase the amplification of the switch Q3 when the voltage amplitude of the input power is above a threshold, and said variable nominal mains level range falling within at least 90V to 305V.

The impedance tuning circuit Q4 could be a switch Q4 that parallel connects an extra resistor R7 with the resistor R3 to reduce the emitter resistance of the switch Q3. The switch Q4 is activated in case the voltage VCC is high enough to break down the zener D5.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A ring choke power converter comprising
    an input for receiving an input power with a nominal mains level, wherein said nominal mains level is variable and falls within at least 90V to 240V;
    a main power switch driven by the input power, wherein the main power switch is a main power bipolar transistor; and
    a control circuit for controlling a control current of the main power switch;
    wherein the control circuit is adapted to sense the level of the input power and draw current from a control terminal of the power switch according to the level, and said control circuit is adapted to operate in a linear region and increase the drawn current along with the increase of the level throughout said variable nominal mains level of the input power, wherein the control circuit comprises:
        a Darlington bridge with a first transistor and a second transistor, the first transistor with a base terminal connected to a circuit position indicative of the voltage amplitude of the input power, the second transistor with a base terminal connected to an emitter terminal of the first transistor and a collector terminal connected to the control terminal of the main power switch and a collector terminal of the first transistor; and a resistor network coupled to the emitter of the second transistor for regulating the amplification of the second transistor and keeping the second transistor working in the linear region throughout the variable nominal mains level of the input power.

2. The ring choke power converter as claimed in claim 1, wherein the resistor network comprises a first resistor connected to the emitter of the second transistor.

3. The ring choke power converter as claimed in claim 2, wherein the switch set further comprises:

an impedance tuning circuit, adapted to tuning the impedance of the resistor network according to an amplitude of the input power.

4. The ring choke power converter as claimed in claim 2, wherein the power converter is a self-oscillation type converter, and the power converter comprising:

a main inductor, for storing energy from the input power and releasing energy during the switching of the main power switch; and an auxiliary inductor, magnetically coupled to the main inductor and connected to the control terminal of the main power switch, adapted for controlling the main power switch.

5. The ring choke power converter as claimed in claim 4, wherein the auxiliary inductor is adapted to increase inductor current provided toward the control terminal of the main power switch along with the increase of the input power throughout said variable nominal mains level range of the input power, and the difference current between the inductor current and the drawn current which eventually reaches the control terminal of the main power switch is substantially the same or slightly decreases as the input power increases throughout the variable nominal mains level range.

6. The ring choke power converter as claimed in claim 4, wherein said circuit position is on a buffering capacitor that is charged by said auxiliary inductor.

7. The ring choke power converter as claimed in claim 4, wherein said control terminal of the switch set is coupled to the auxiliary inductor via a forward diode.

8. The ring choke power converter as claimed in claim 1, wherein said first transistor is adapted to operate in saturation region throughout the said variable nominal mains level of the input power.

9. The ring choke power converter as claimed in claim 1, wherein the power converter further comprises a second resistor connected between the emitter of the main power bipolar transistor and ground, wherein said second resistor is adapted to increase the collector voltage of the second transistor such that the collector-base voltage of the second transistor is forwardly biased away from saturation region and the base of the first transistor is decoupled from the second resistor.

10. The ring choke power converter as claimed in claim 9, wherein an impedance tuning circuit is adapted to decrease the impedance of the resistor and increase the amplification of the second switch when the voltage amplitude of the input power is above a threshold, and said variable nominal mains level falls within at least 90V to 305V.

11. A light emitting diode (LED) lighting circuit, comprising a LED and a ring choke power converter as claimed in claim 1 for powering said LED.

* * * * *